United States Patent
Peterson et al.

(10) Patent No.: US 9,382,986 B2
(45) Date of Patent: Jul. 5, 2016

(54) DUAL CLUTCH TRANSMISSION

(71) Applicant: Eaton Corporation, Cleveland, OH (US)

(72) Inventors: Paul Peterson, Scotts, MI (US); Matthew Busdiecker, Beverly Hills, MI (US); Joseph Reynolds, Climax, MI (US); James Walker, Kalamazoo, MI (US); Thomas Stoltz, Allen Park, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/479,494

(22) Filed: Sep. 8, 2014

(65) Prior Publication Data
US 2015/0068336 A1  Mar. 12, 2015

Related U.S. Application Data

(60) Provisional application No. 61/874,436, filed on Sep. 6, 2013, provisional application No. 61/876,823, filed on Sep. 12, 2013.

(51) Int. Cl.
*F16H 3/08* (2006.01)
*F16H 37/04* (2006.01)
*F16H 3/00* (2006.01)

(52) U.S. Cl.
CPC .............. *F16H 37/046* (2013.01); *F16H 3/006* (2013.01); *F16H 2200/0069* (2013.01); *F16H 2200/0086* (2013.01); *F16H 2200/2005* (2013.01); *Y10T 74/19228* (2015.01)

(58) Field of Classification Search
CPC . F16H 3/006; F16H 2003/0931; F16H 3/091; F16H 47/02

USPC .................... 74/330, 331, 333, 340
See application file for complete search history.

(56) References Cited

U.S. PATENT DOCUMENTS

| | | | | |
|---|---|---|---|---|
| 5,823,051 A * | 10/1998 | Hall, III | .................. | F16H 3/006 475/207 |
| 7,070,534 B2 * | 7/2006 | Pelouch | ................ | F16H 37/046 275/207 |
| 7,469,609 B2 | 12/2008 | Baldwin | | |
| 7,587,957 B2 | 9/2009 | Jackson | | |
| 7,846,055 B2 * | 12/2010 | Earhart | .................. | F16H 3/006 475/207 |
| 7,896,770 B2 * | 3/2011 | Earhart | ............... | F16H 37/0833 475/209 |
| 7,913,581 B2 | 3/2011 | Jackson | | |
| 8,230,753 B2 | 7/2012 | Jackson | | |
| 8,453,531 B2 * | 6/2013 | Gumpoltsberger | ..... | F16H 3/006 74/330 |
| 2007/0220999 A1 * | 9/2007 | Hatori | ..................... | F16H 3/006 74/330 |
| 2010/0218629 A1 * | 9/2010 | Gumpoltsberger | ..... | F16H 3/006 74/331 |
| 2010/0257964 A1 * | 10/2010 | Rieger | .................... | F16H 3/006 74/331 |
| 2012/0240723 A1 * | 9/2012 | Gluckler | .................. | B60K 6/36 74/661 |
| 2014/0165755 A1 | 6/2014 | Morris et al. | | |

* cited by examiner

*Primary Examiner* — Ha D Ho
(74) *Attorney, Agent, or Firm* — Remarck Law Group PLC

(57) ABSTRACT

A dual clutch transmission includes a first and second concentric input shafts, a dual clutch assembly, a mainshaft coaxial with the first input shaft, a first countershaft, a second countershaft, and planetary range gearing with high and low ratios. The dual clutch transmission has six forward gear meshes and the high and low range ratios of the range gearing to provide ten forward gear ratios for the transmission. The transmission is powershiftable between consecutive gear ratios of the ten forward gear ratios such that no torque interrupt occurs during sequential shifts.

25 Claims, 13 Drawing Sheets

DUAL CLUTCH TRANSMISSION

CROSS-REFERENCE TO RELATED APPLICATIONS

This application claims the benefit of U.S. provisional Application No. 61/874,436 filed Sep. 6, 2013, and U.S. provisional Application No. 61/876,823 filed Sep. 12, 2013, the disclosures of which are incorporated in their entirety by reference herein.

TECHNICAL FIELD

Various embodiments relate to a powershifting dual clutch transmission.

BACKGROUND

Conventional automotive vehicle powertrains typically have multiple-ratio transmission mechanisms that establish power delivery paths from an engine to vehicle traction wheels. Often, with known heavy-duty or medium-duty powertrains, the torque flow path is interrupted during a change in gear ratio or during transition from one range to the other. That torque interruption may deteriorate the shift quality and cause drivability issues due to the loss of acceleration during the shift resulting in an un-smooth acceleration, loss of speed during the shift, and/or longer times to reach a desired cruise speed. Further, the time needed to execute a ratio change in the range gearing increases the time needed to execute a shift between the highest overall ratio for one range to the adjacent lowest overall ratio for another range.

SUMMARY

In an embodiment, a dual clutch transmission is provided. A first input shaft supports first and second headset gear elements. A second input shaft is concentric with the first input shaft and supports third and fourth headset gear elements. A dual clutch assembly is connected to the first and second input shafts. A mainshaft is coaxial with the first input shaft and supports first and second mainshaft gear elements, and a sun gear connected to the mainshaft for rotation therewith. A first countershaft is offset from the first input shaft and supports five countershaft gear elements. A second countershaft is offset from the first input shaft and supports three countershaft gear elements. A range gearing has high and low ratios, and has a carrier and a ring gear cooperating with the sun gear of the mainshaft to form a planetary gearset. An output shaft is coaxial with and connected to the carrier of the range gearing for rotation therewith. The first and second input shafts, the mainshaft, and the first and second countershafts provide six forward gear meshes for the transmission. The six forward gear meshes and the high and low range ratios of the range gearing provide ten forward gear ratios for the transmission. The transmission is powershiftable between consecutive gear ratios of the ten forward gear ratios such that no torque interrupt occurs during sequential shifts.

In another embodiment, a dual clutch transmission is provided. A first input shaft is connected to the dual clutch assembly and supports a first headset gear element. A second input shaft is connected to the dual clutch assembly and is concentric with the first input shaft. The second input shaft supports a second headset gear element. A dual clutch assembly selectively establishes and disestablishes driving connections between an engine and each of the first and second input shafts to powershift the transmission between consecutive gear ratios. A first countershaft is offset from the first input shaft and supports a first countershaft gear element forming a first gear mesh with the first headset gear element and a second countershaft gear element forming a second gear mesh with the second headset gear element. The second gear mesh is positioned between the dual clutch assembly and the first gear mesh. An output shaft and gear ratio change clutches for selectively establishing torque flow paths through the transmission are also provided. A torque flow path is provided sequentially through the first input shaft, the first gear mesh, the first countershaft, the second gear mesh, the second input shaft, and the output shaft.

In yet another embodiment, a dual clutch transmission is provided with a dual clutch assembly, a first input shaft selectively driven by the dual clutch assembly, a second input shaft concentric with the first input shaft and selectively driven by the dual clutch assembly, and a mainshaft. A first countershaft assembly is offset from the first input shaft and has countershaft gear elements in meshed engagement with gear elements of the first input shaft, the second input shaft, and the mainshaft to provide five forward gear meshes. A second countershaft assembly is offset from the first input shaft and the second input shaft and has countershaft gear elements in meshed engagement with gear elements of the first input shaft, the second input shaft, and the mainshaft.

Planetary range gearing is connected to the mainshaft and has high and low range clutches adapted to provide and preselect a high range ratio and a low range ratio. An output shaft is connected to the planetary range gearing. The transmission is powershiftable between ten consecutive forward gear ratios such that the transmission operates without torque interrupts during sequential increasing and decreasing forward shifts.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
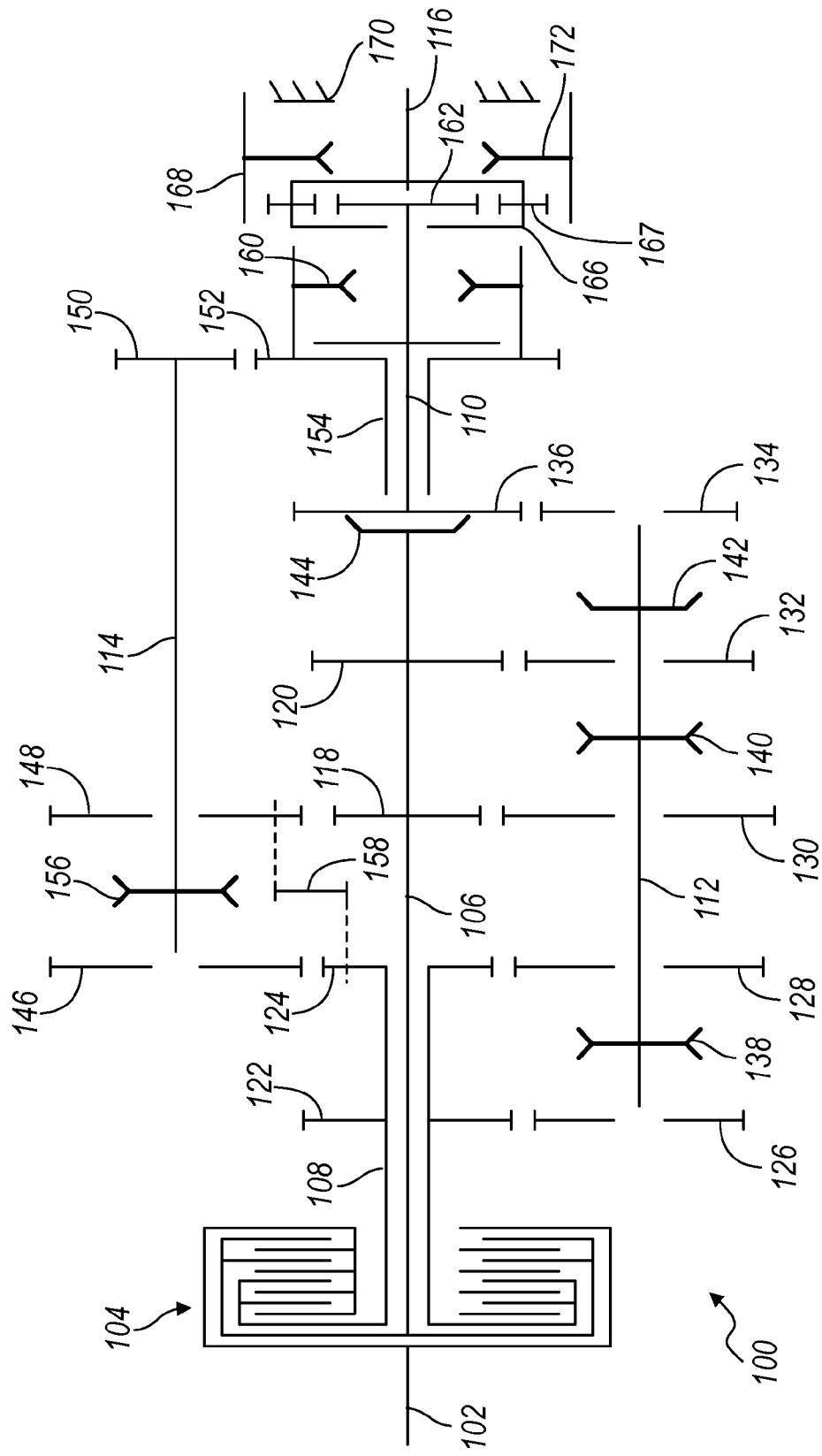
FIG. 1 is a diagram for a powershifting dual clutch transmission according to an embodiment.

FIG. 1 illustrates an embodiment of a multiple speed, dual clutch transmission 100 layout for a fully powershiftable transmission through the forward gear ratios. No torque interrupt occurs across the transmission when powershifting from one gear ratio to another, typically adjacent gear ratio. FIG. 1 includes clutch placements and gear element to shaft connections according to an embodiment. The transmission 100 is fully powershiftable through ten forward speeds, and is powershiftable between two reverse speeds. The transmission 100 has a dual clutch with powershiftable, planetary range gearing.

The transmission 100 includes a transmission mainshaft and countershaft gear elements journaled on one or more countershaft(s) arranged in spaced, parallel disposition with respect to the mainshaft. The countershaft gear elements typically mesh with the gears mounted on a mainshaft axis. Controlled clutches, such as positive drive dog clutches or synchronizer clutches, selectively connect torque transmitting gears to their respective shaft, thereby establishing a power delivery path from the engine to the traction wheels. The controlled clutches may be mounted along the mainshaft axis or a countershaft axis. The controlled clutches may be operator controlled, computer controlled, or automatically controlled.

The dual clutch arrangement selectively connects the engine to first and second torque input gears, also called headset gears, of a countershaft transmission mechanism. A dual clutch arrangement makes it possible for a countershaft transmission mechanism to be powershifted from one ratio to another. As one of the dual clutches is engaged, the other is disengaged. The engaged clutch will establish a power delivery path through the countershaft gear elements and through the main transmission gears as one or more of the ratio change clutches are engaged. A ratio change clutch for a main transmission gear, or a countershaft gear element that is not involved in a given selected power flow path, can be preselected or preengaged in preparation for a ratio change to an adjacent or sequential ratio. The dual clutches of the dual clutch arrangement are alternately engaged and disengaged to provide a smooth transition from one ratio to an adjacent ratio in a seamless fashion and without a torque interrupt.

The ability to shift a dual clutch transmission between two gear ratios during a tip-in event, such as when the accelerator pedal is engaged or the throttle is at least partially opened, is a powershift event. Torque interrupts during a shift by the transmission may be avoided if the transmission is designed such that it powershifts. Presently, conventional dual clutch transmissions may partially powershift, or powershift through only a portion of the shifts such that there are still some torque interrupts for some of the shifts. It is difficult to design a transmission with the appropriate gear ratios and step sizes where all of the shifts are powershifts such that the transmission is fully powershiftable. As a dual clutch transmission becomes more complex and includes a greater number of speeds, packaging concerns also arise. It becomes challenging to provide powershifting between all of the gear ratios such that the transmission is fully and continuously powershiftable with no torque interrupts for a shift while minimizing a part count for the transmission to meet packaging and other requirements. The present transmission 100 provides for a dual clutch transmission having two-speed range gearing that is fully powershiftable through ten forward gear ratios.

FIG. 1 depicts a dual clutch transmission 100 having concentric input shafts, two countershafts or layshafts, and two speed range gearing. FIG. 1 represents a shaft layout of the transmission 100 and is not limiting in terms of how the gears are attached to the input shaft, a mainshaft, or countershaft. For example, a sleeve shaft may be provided on the countershaft and/or mainshaft, gears may be splined to a shaft or supported by a journal connection, and the like. In another embodiment, the transmission 100 may have a single countershaft with a concentric layshaft, an no reverse idler. It is also possible to use various clutch arrangements and gear diameter sizing with the transmission 100, examples of which are described below.

A shaft 102 is connected to the dual clutch 104 of the transmission 100. Shaft 102 may be connected to a prime mover, such as an engine, that provides input torque to the transmission 100. The dual clutch 104 is configured to provide torque to either a first input torque shaft 106 or a second input torque shaft 108 from shaft 102. Input shaft 108 is a sleeve shaft that surrounds input shaft 106. Input shaft 108 may be journaled within the transmission housing (not shown). Input shaft 106 is journaled within input shaft 108. Shafts 106, 108 are coaxial with one another.

The transmission 100 has one or more mainshaft sections 110. The mainshaft 110 is coaxial with the input shafts 106, 108. The transmission has a first countershaft 112 and a second countershaft 114. The countershafts 112, 114 are offset from the input shafts 106, 108 and mainshaft 110. The countershafts 112, 114 are illustrated as being offset from one another; however, in other embodiments, the countershafts 112, 114 may be concentric with one another. The transmission 100 also has an output shaft 116 that may be coaxial with the mainshaft 110.

Input shaft 106 has a headset gear 118 and a headset gear 120 acting as transmission torque input gears. As shown in FIG. 1, the headset gears 118, 120 may be directly connected to the shaft 106, for example, by a splined connection or other drivable connection. Alternatively, in other examples, one or both of the headset gears 118, 120 may be journaled to the shaft 106 for selective connection, for example, by a clutch device, such as a synchronizing clutch assembly, a dog clutch, or the like.

Input shaft 108 a headset gear 122 and a headset gear 124 acting as transmission torque input gears. As shown in FIG. 1, the headset gears 122, 124 may be directly connected to the shaft 108, for example, by a splined connection or other drivable connection. Alternatively, one or both of the headset gears 122, 124 may be journaled to the shaft 108 for selective connection, for example, by a clutch device, such as a synchronizing clutch assembly, a dog clutch, or the like.

The first countershaft 112 is supported for rotation by the transmission 100 housing by bearings. The countershaft 112 of the transmission 100 has countershaft gears 126, 128, 130, 132, 134. One or more of the countershaft gears 126, 128, 130, 132, 134 may be journaled to the shaft 112 for selective connection, for example, by a clutch device, such as a synchronizing clutch assembly, a dog clutch, or the like. A gear mesh is formed with gear 118 and gear 130. Gear 120 meshes with gear 132 on the countershaft 112. Gear 122 meshes with gear 126 on the countershaft. Gear 124 meshes with gear 128. Another layer of gear mesh is formed by gear 134 on the countershaft 112 and gear 136 on the mainshaft 110.

As shown in FIG. 1, all of the countershaft gear elements 126, 128, 130, 132, 134 are journaled to the countershaft 112 and are selectively connected to the countershaft using clutch elements. The clutch sleeve of clutch 138 is shifted to the left to drivably connect gear 126 with the countershaft 112. The clutch sleeve of clutch 138 is shifted to the right to drivably connect gear 128 with the countershaft 112.

The clutch sleeve of clutch 140 is shifted to the left to drivably connect gear 130 with the countershaft 112. The clutch sleeve of clutch 138 is shifted to the right to drivably connect gear 132 with the countershaft 112.

The clutch sleeve of clutch 142 is shifted to the right to drivably connect gear 134 with the countershaft 112.

The clutch sleeve of clutch 144 may be shifted to the right to drivably connect the input shaft 106 with gear 136 of the mainshaft 110.

The second countershaft 114 is supported for rotation by the transmission 100 housing by bearings. The countershaft 114 of the transmission 100 has countershaft gears 146, 148, 150. The countershaft forward gear 146 and reverse gear 148 may be journaled to the shaft 112 for selective connection, for example, by a clutch device, such as a synchronizing clutch assembly, a dog clutch, or the like. The countershaft gear element 150 may be directly connected to the shaft 108, for example, by a splined connection or other drivable connection. A gear mesh is formed with gear 124 and gear 146. Gear 118 meshes with gear 148 on the countershaft 114. Another layer of gear mesh is formed by gear 150 on the countershaft 114 and gear 152 on a sleeve shaft 154 journaled about the mainshaft 110.

As shown in FIG. 1, the countershaft gear elements 146, 148 are journaled to the countershaft 114 and are selectively connected to the countershaft using clutch elements. The clutch sleeve of clutch 156 is shifted to the left to drivably connect forward gear 146 with the countershaft 114. The clutch sleeve of clutch 156 is shifted to the right to drivably connect reverse gear 148 with the countershaft 114.

An idler gear 158 or a reverse drive pinion may be positioned to connect gears 124 and 148 to provide for two reverse gear ratios. In the example shown in FIGS. 1 and 2, the transmission 100 has high and low reverse drives based on which of the dual clutches is driving the input shafts 108, 106, respectively.

The mainshaft 110 has mainshaft gear 136 directly connected to the left hand end of the shaft 110, for example, by a splined connection or other drivable connection. The sleeve shaft 154 is concentric with and journaled about the mainshaft 110. The sleeve shaft 154 has gear 152 directly connected to it, for example, by a splined connection or other drivable connection. A clutch 160 may be shifted to the left to connect the gear 152 and sleeve shaft 154 to the mainshaft 110.

The right hand end of the mainshaft 110 is drivably connected to a sun gear 162 of the two-speed range gearing 164. A planetary carrier 166 of the two-speed range gearing 12 is connected to or is integral with a power output shaft 116, which is connected drivably through a drive shaft to vehicle traction wheels. Ring gear 168 of the two-speed range gearing 164 engages planet pinions 167 carried by the carrier 166.

Ring gear 168 is selectively connected to the transmission housing portion 170 and to the carrier 166 by a high/low range gearing clutch 172. The clutch 172 may be a synchronizer type clutch, and may include a shiftable clutch sleeve that engages teeth on the housing portion 170 when it is shifted in a right-hand direction to connect the ring gear 168 and the housing 170. When clutch 172 is shifted to the right, the ring gear 168 is anchored or fixed to the housing 170. When the clutch 172 sleeve is shifted in a left-hand direction, it drivably engages teeth formed on the carrier 166 to connect the ring gear 168 and the carrier 166 such that they co-rotate with one another.

Clutch 160 may be shifted to the right to connect the gear 152 and sleeve shaft 154 to the carrier 166.

Note that the various clutch arrangements in FIG. 1 may be modified, for example, by replacing a three-position clutch with two two-position clutches, and the like.

FIGS. 2-11 illustrate powerpaths or torque flow paths (shown by arrows with solid lines) for forward gear ratios for the transmission of FIG. 1, and common reference numbers are used for common elements. The transmission 100 is illustrated in FIGS. 2-11 as a cross-sectional schematic view according to an example. The transmission 100 as shown in FIGS. 2-11 powershifts between consecutive gear ratios such that there are no torque interrupts during a shift. The clutches that are engaged to preselect the next or consecutive gear ratio are also provided for each gear ratio. The dual clutch 104 is alternatively engaged during a powershift between adjacent or sequential gear ratios. A preselected power path is illustrated in FIGS. 2-10 for the sequential upshift as a dashed arrow.

Figure 2:
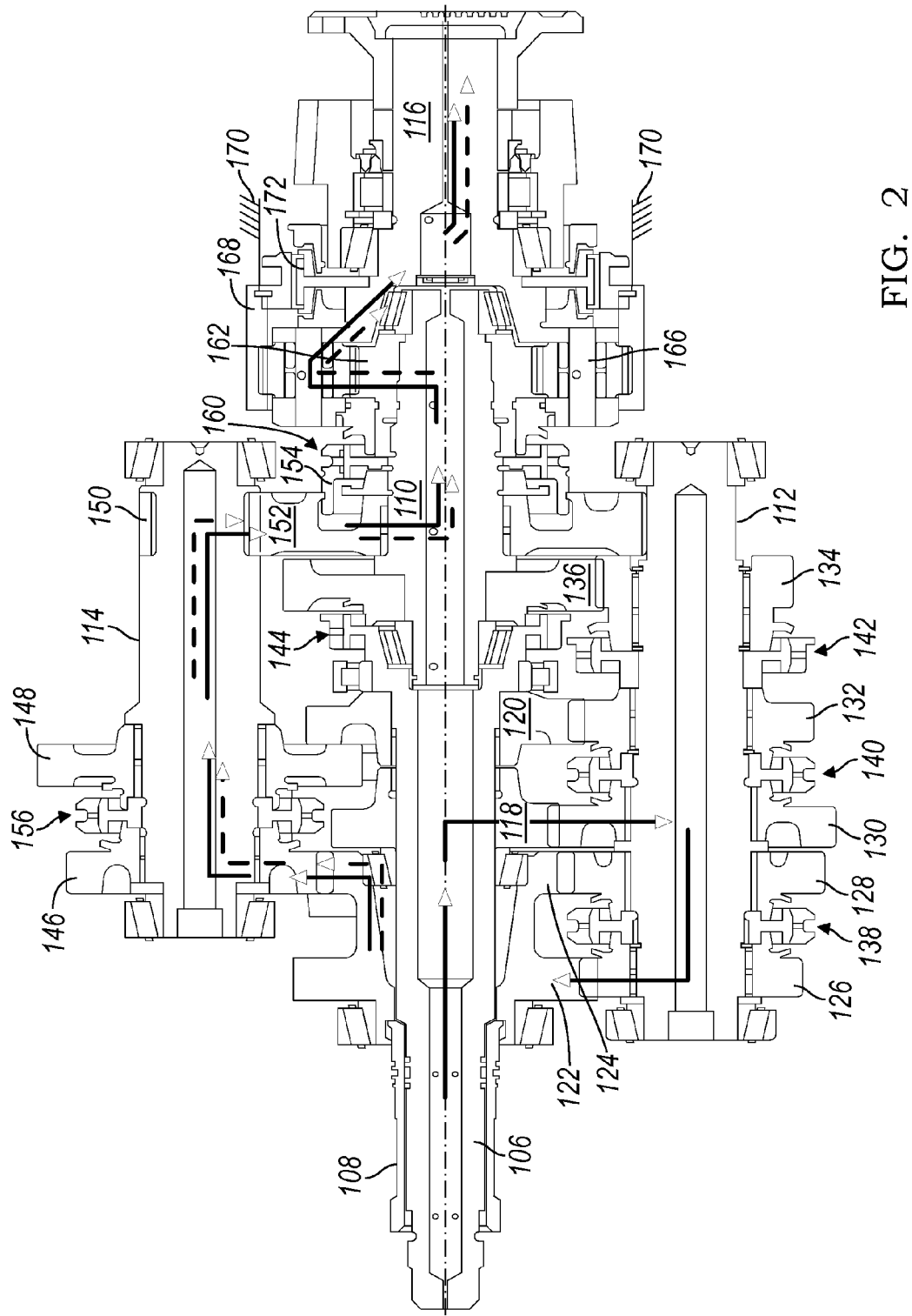
FIG. 2 is a schematic of the transmission of FIG. 1 according to an embodiment illustrating a first powerpath.

FIG. 2 illustrates the transmission 100 in a first gear ratio. The torque path for the first gear ratio begins at the input shaft 102, and through the dual clutch 104 that is engaged such that the torque flows to the input shaft 106. Clutch 140 is engaged on the countershaft 112 and shifted to the left to connect journaled countershaft gear element 130 to the countershaft 112. Torque flows from the headset gear 118 to countershaft gear element 130 and to the countershaft 112. Clutch 138 is shifted to the left to connect the countershaft 112 to countershaft gear element 126 such that the torque flows to the headset gear 122 and to input shaft 108. Clutch 156 is shifted to the left to connect countershaft forward gear 146 to the countershaft 114 such that torque flows from the input shaft 108 to the countershaft 114.

Clutch 160 is shifted to the left such that gear 152 is connected to the mainshaft 110 for rotation therewith. Torque therefore flows from the countershaft 114 through meshed gears 150, 152 and to the mainshaft 110.

The sun gear 162 is connected to and driven by the mainshaft 110. The sun gear is meshed with and drives the planet pinions on the carrier 166 which is connected to and drives the output shaft 116. Clutch 172 is shifted to the right such that the ring gear 168 is connected and anchored to the transmission housing 170. Therefore the speed of the shaft 116 is reduced relative to the mainshaft 110. Torque flows from the mainshaft 110, through the sun gear 162, the carrier 166, and to the output shaft 116.

Note that the torque path forms a loop structure to flow through the input shaft 106, the countershaft 112, the other input shaft 108, and to the other countershaft 114.

The second gear ratio is already preselected as clutches 130, 156, 160, and 172 are engaged in the first gear ratio, and to powershift from first to second gear requires only a change in the engagement of the dual clutch 104. Clutches 142 and 144 are in a neutral (un-engaged) position.

Figure 3:
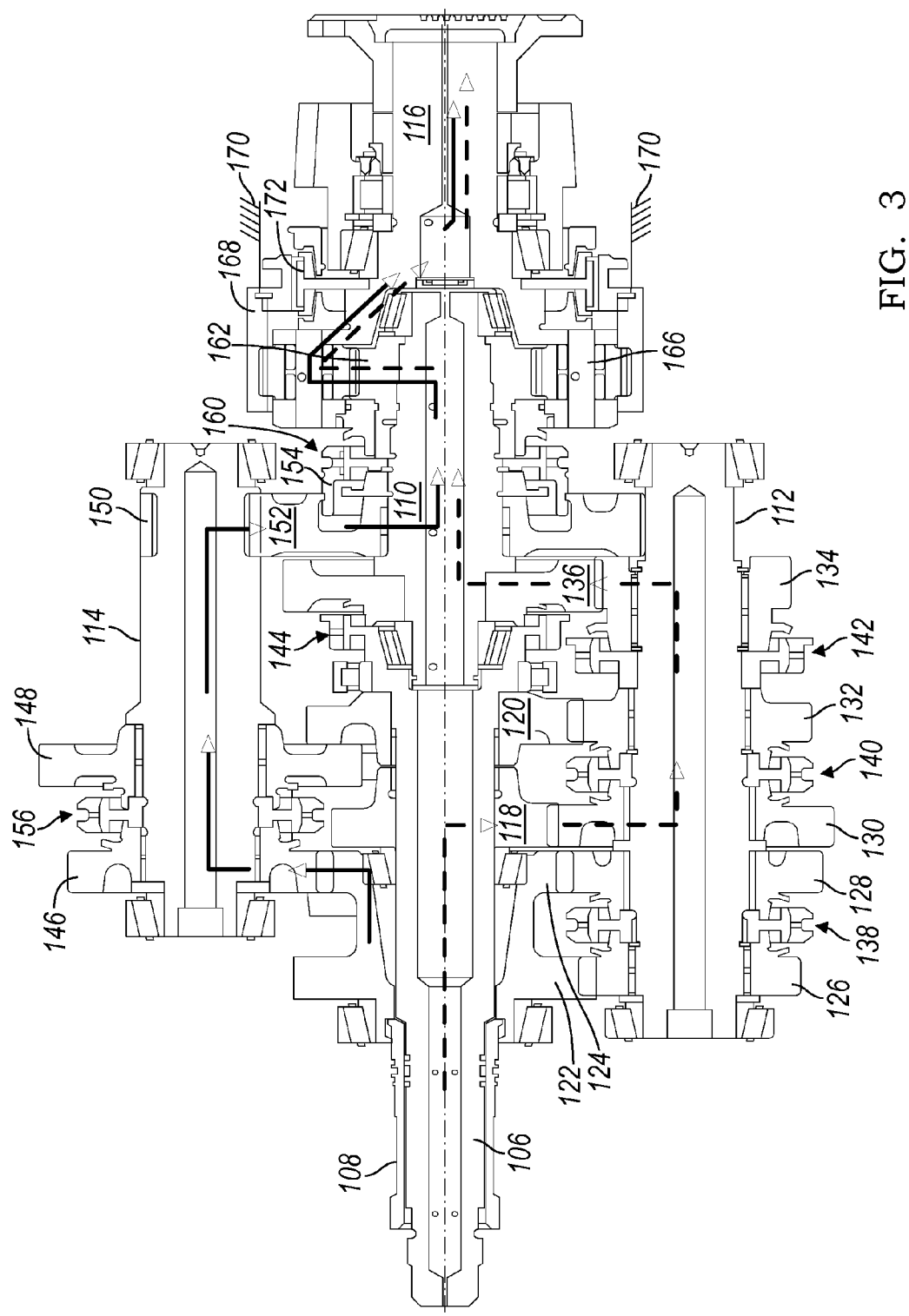
FIG. 3 is a schematic of the transmission of FIG. 2 illustrating a second powerpath.

FIG. 3 illustrates the transmission 100 in a second gear ratio. The dual clutch 104 is engaged such that the torque flows to the input shaft 108. Clutch 156 is shifted to the left to connect countershaft gear 146 to the countershaft 114 such that torque flows from the input shaft 108 to the countershaft 114 across the gear mesh formed by the headset gear 124 and the countershaft gear element 146. Clutch 160 is shifted to the left such that gear 152 is connected to the mainshaft 110 for rotation therewith. Torque flows from the countershaft 114 through meshed gears 150, 152 and to the mainshaft 110.

The sun gear 162 is connected to and driven by the mainshaft 110. The sun gear is meshed with and drives the planet pinions on the carrier 166 which is connected to and drives the output shaft 116. Clutch 172 is shifted to the right such that the ring gear 168 is connected and anchored to the transmission housing 170. Therefore the speed of the shaft 116 is reduced relative to the mainshaft 110. Torque flows from the mainshaft 110, through the sun gear 162, the carrier 166, and to the output shaft 116.

Clutches 138 and 142 may be preselected for a sequential shift. Clutch 144 remains in neutral and clutch 140 remains shifted to the left.

Figure 4:
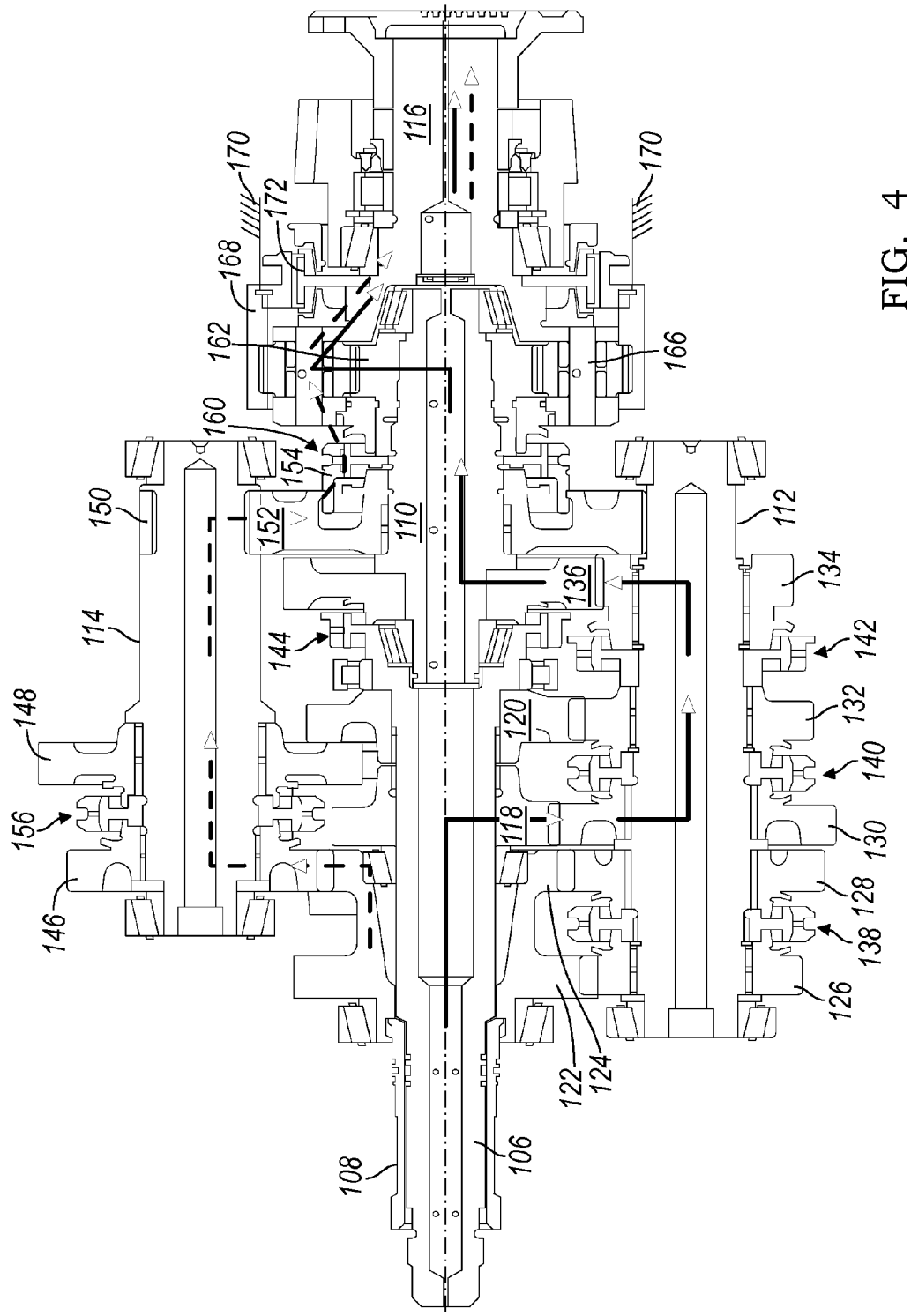
FIG. 4 is a schematic of the transmission of FIG. 2 illustrating a third powerpath.

FIG. 4 illustrates the transmission 100 in a third gear ratio. The dual clutch 104 that is engaged such that the torque flows to the input shaft 106. Clutch 140 is engaged on the countershaft 112 and shifted to the left to connect journaled countershaft gear element 130 to the countershaft 112. Torque flows from the headset gear 118 to countershaft gear element 130 and to the countershaft 112. Clutch 142 is shifted to the right to connect the countershaft gear 134 with the countershaft 112. Torque flows from the countershaft 112 across the gear mesh formed by gears 134, 136 and to the mainshaft 110. The clutch 156 is shifted to the left to maintain the forward gear ratio.

The sun gear 162 is connected to and driven by the mainshaft 110. The sun gear is meshed with and drives the planet pinions on the carrier 166 which is connected to and drives the output shaft 116. Clutch 172 is shifted to the right such that the ring gear 168 is connected and anchored to the transmission housing 170. Therefore the speed of the shaft 116 is reduced relative to the mainshaft 110. Torque flows from the mainshaft 110, through the sun gear 162, the carrier 166, and to the output shaft 116.

The clutch 156 is shifted to the left to maintain the forward gear ratio. Clutch 160 may be preselected for a sequential shift as gear 152 is carrying no torque. Clutches 138, 144 are in a neutral position.

Figure 5:
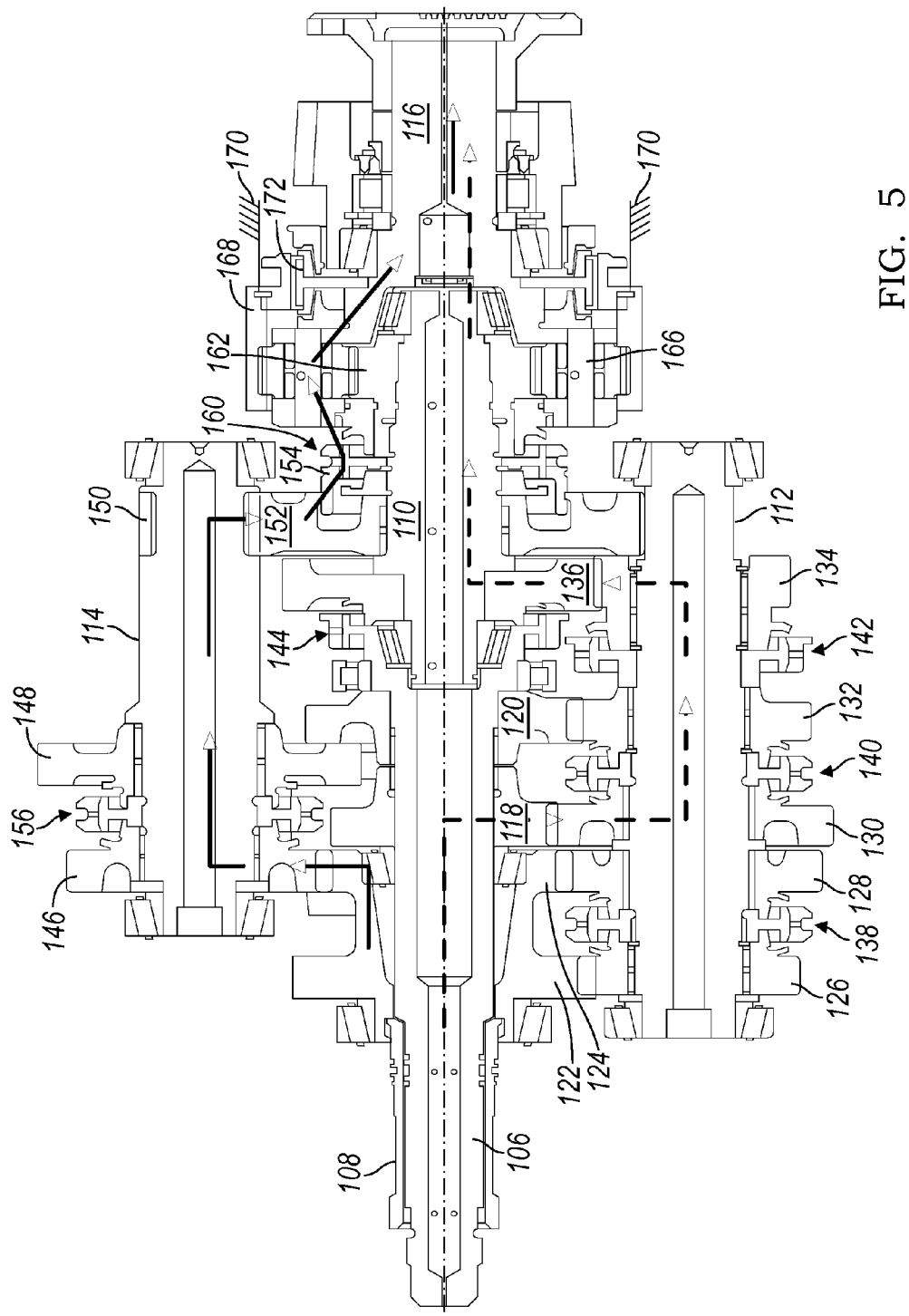
FIG. 5 is a schematic of the transmission of FIG. 2 illustrating a fourth powerpath.

FIG. 5 illustrates the transmission 100 in a fourth gear ratio. The dual clutch 104 is engaged such that the torque flows to the input shaft 108. Clutch 156 is shifted to the left to connect countershaft forward gear 146 to the countershaft 114 such that torque flows from the input shaft 108 to the countershaft 114 across the gear mesh formed by the headset gear 124 and the countershaft gear element 146. Clutch 160 is shifted to the right such that gear 152 is connected to the carrier 166 for rotation therewith. Gear 152 is journaled about and rotates relative to the mainshaft 110. Torque therefore flows from the countershaft 114 through meshed gears 150, 152, through the clutch 160, and to the carrier 166 and the output shaft 116.

Clutch 172 may be preselected for a sequential shift as gear 152 and the carrier 166 are co-rotating. Clutches 140, 142 remain in their positions. Clutches 138, 144 are in a neutral position.

Figure 6:
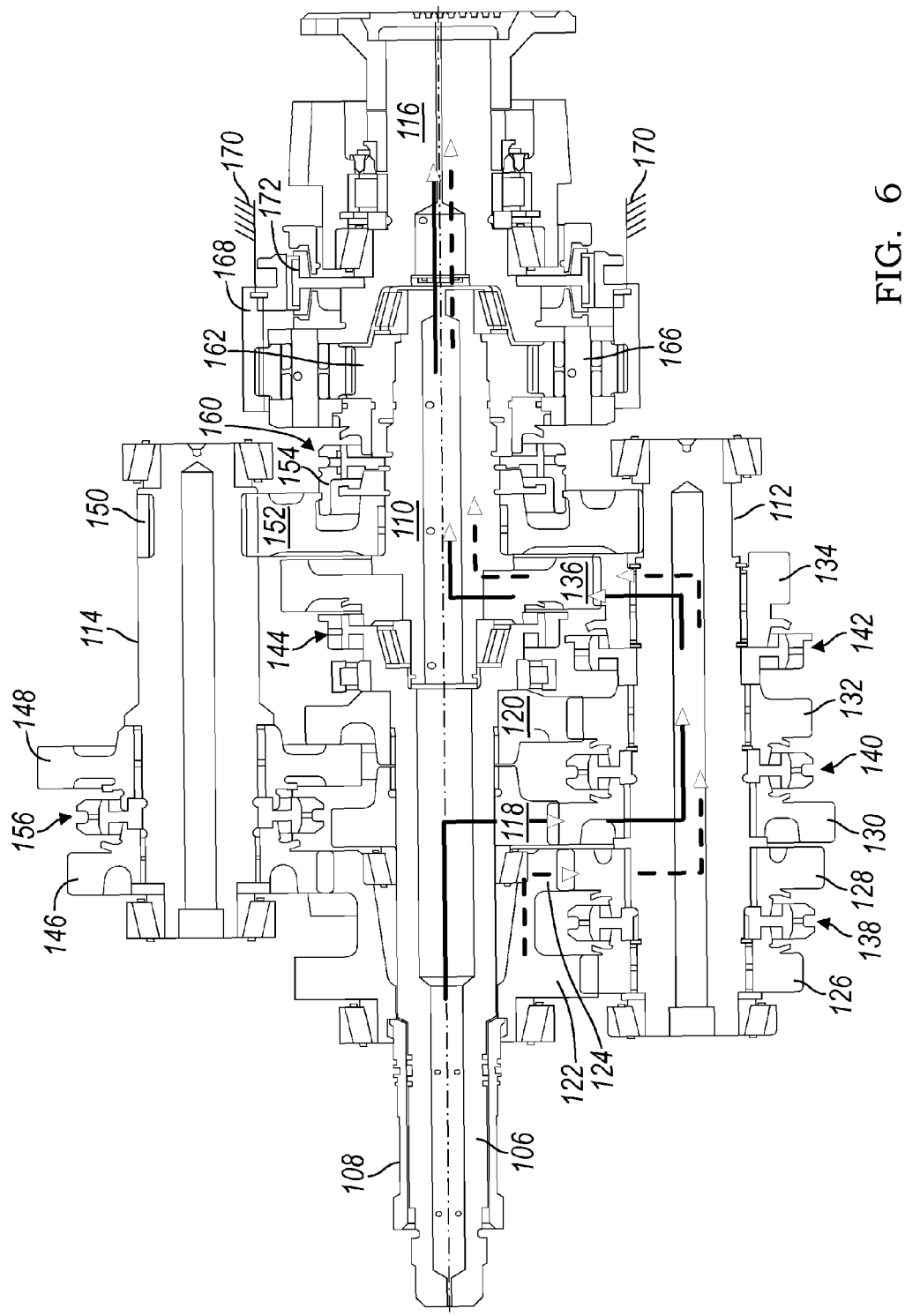
FIG. 6 is a schematic of the transmission of FIG. 2 illustrating a fifth powerpath.

FIG. 6 illustrates the transmission 100 in a fifth gear ratio. The dual clutch 104 is engaged such that the torque flows to the input shaft 106. Clutch 140 is engaged on the countershaft 112 and shifted to the left to connect journaled countershaft gear element 130 to the countershaft 112. Torque flows from the headset gear 118 to countershaft gear element 130 and to the countershaft 112. Clutch 142 is shifted to the right to connect the countershaft gear 134 with the countershaft 112. Torque flows from the countershaft 112 across the gear mesh formed by gears 134, 136 and to the mainshaft 110.

The sun gear 162 is connected to and driven by the mainshaft 110. The clutch 172 is shifted to the left such that the carrier 166 and ring gear 168 are connected to one another and co-rotate and the range gearing is in a high configuration. The sun gear 162 is meshed with and drives the planet pinions on the carrier 166 which is connected to and drives the output shaft 116 at a 1:1 drive ratio between the mainshaft 110 and the output shaft 116.

Clutches 138 and 160 may be preselected for a sequential shift. Clutch 144 is in a neutral position. Clutch 156 is in a left hand position to maintain a forward gear ratio.

Figure 7:
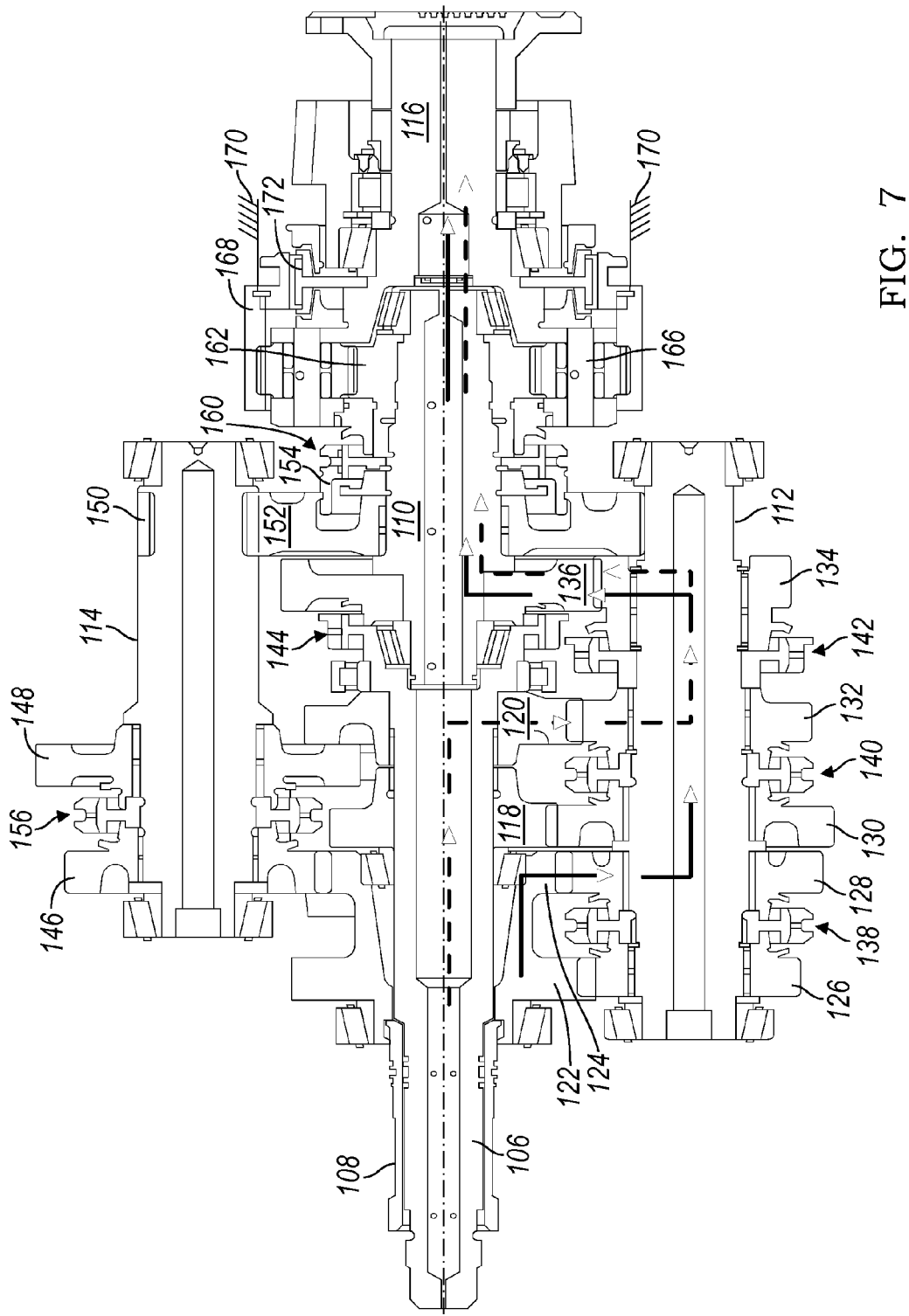
FIG. 7 is a schematic of the transmission of FIG. 2 illustrating a sixth powerpath.

FIG. 7 illustrates the transmission 100 in a sixth gear ratio. The dual clutch 104 is engaged such that the torque flows to the input shaft 108. Clutch 138 is shifted to the right to connect countershaft gear 128 to the countershaft 112 such that torque flows from the input shaft 108 to the countershaft 112 across the gear mesh formed by the headset gear 124 and the countershaft gear element 128. Clutch 142 is shifted to the right such that gear 134 is connected to and rotates with the countershaft 112. Torque flows from the countershaft 112 across the gear mesh 134, 136 and to the mainshaft 110.

The sun gear 162 is connected to and driven by the mainshaft 110. The clutch 172 is shifted to the left such that the carrier 166 and ring gear 168 are connected to one another and co-rotate and the range gearing is in a high configuration. The sun gear 162 is meshed with and drives the planet pinions on the carrier 166 which is connected to and drives the output shaft 116 at a 1:1 drive ratio between the mainshaft 110 and the output shaft 116.

Clutch 140 may be preselected for a sequential shift. Clutches 144, 160 are in a neutral position. Clutch 156 is in a left hand position to maintain a forward gear ratio.

Figure 8:
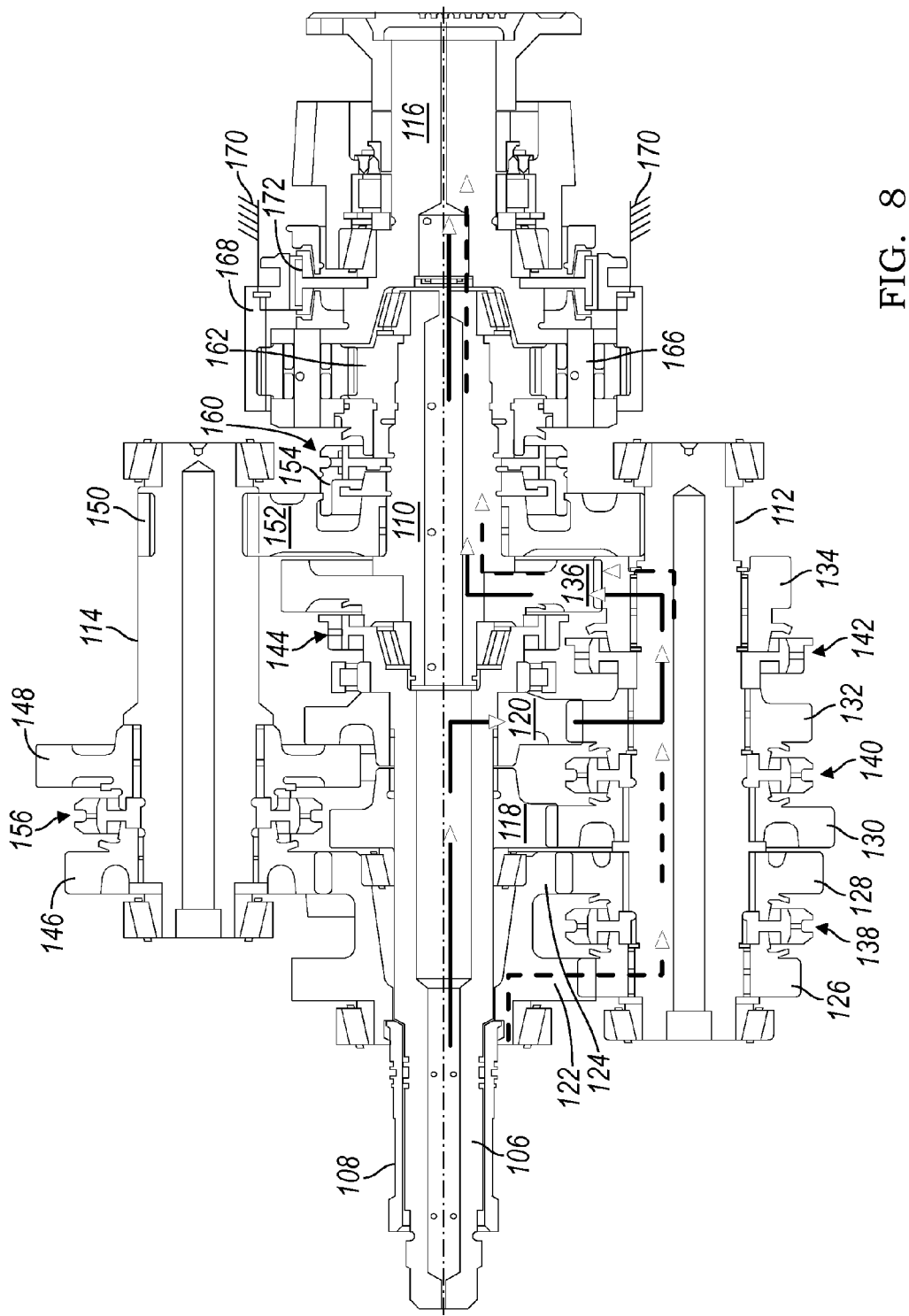
FIG. 8 is a schematic of the transmission of FIG. 2 illustrating a seventh powerpath.

FIG. 8 illustrates the transmission 100 in a seventh gear ratio. The dual clutch 104 is engaged such that the torque flows to the input shaft 106. Clutch 140 is engaged on the countershaft 112 and shifted to the right to connect journaled countershaft gear element 132 to the countershaft 112. Torque flows from the headset gear 120 to countershaft gear element 132 and to the countershaft 112. Clutch 142 is shifted to the right to connect the countershaft gear 134 with the countershaft 112. Torque flows from the countershaft 112 across the gear mesh formed by gears 134, 136 and to the mainshaft 110.

The sun gear 162 is connected to and driven by the mainshaft 110. The clutch 172 is shifted to the left such that the carrier 166 and ring gear 168 are connected to one another and co-rotate and the range gearing is in a high configuration. The sun gear 162 is meshed with and drives the planet pinions on the carrier 166 which is connected to and drives the output shaft 116 at a 1:1 drive ratio between the mainshaft 110 and the output shaft 116.

Clutch 138 may be preselected for a sequential shift. Clutches 144, 160 are in a neutral position. Clutch 156 is in a left hand position to maintain a forward gear ratio.

Figure 9:
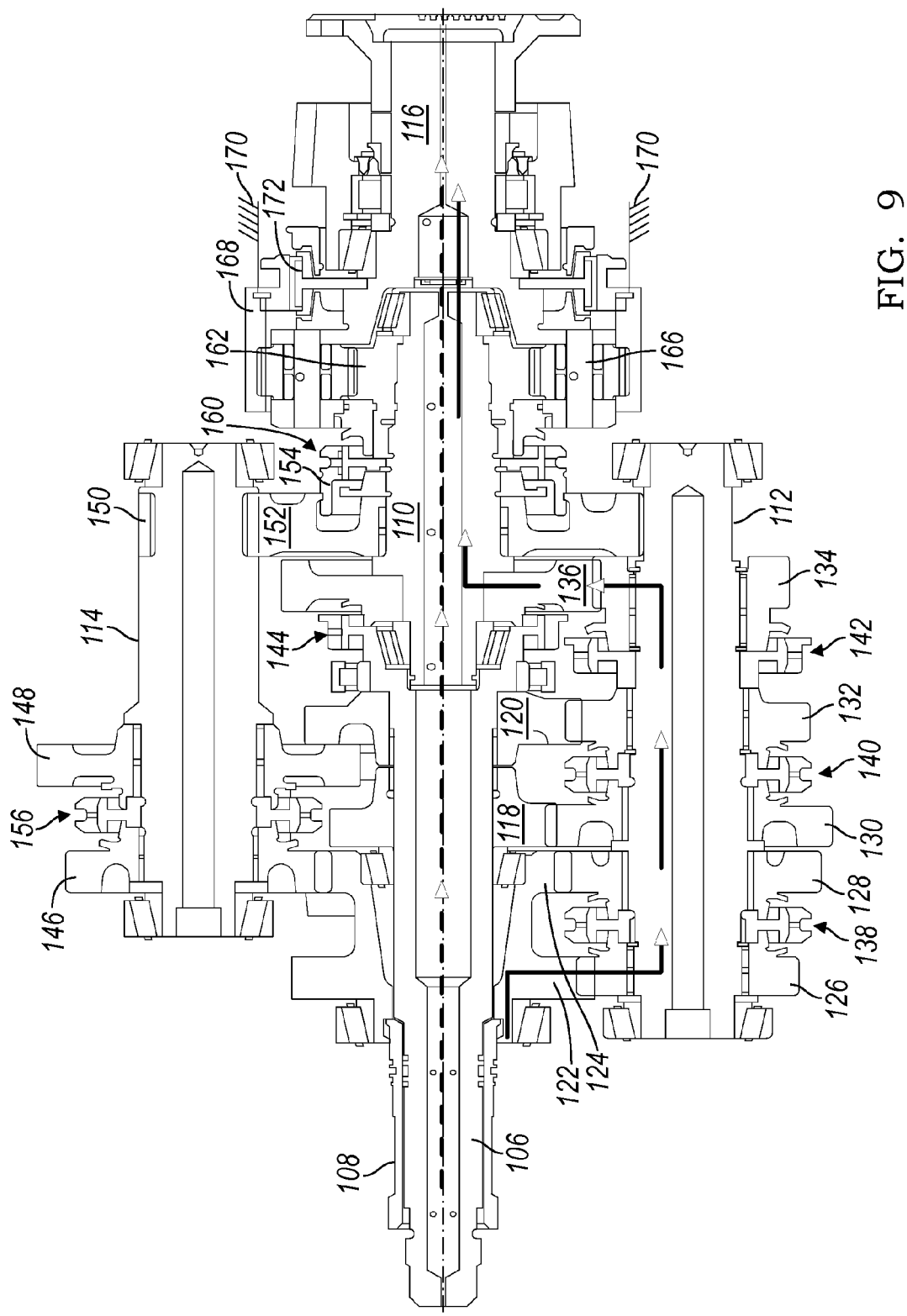
FIG. 9 is a schematic of the transmission of FIG. 2 illustrating a eighth powerpath.

FIG. 9 illustrates the transmission 100 in an eighth gear ratio. The dual clutch 104 is engaged such that the torque flows to the input shaft 108. Clutch 138 is shifted to the left to connect countershaft gear 126 to the countershaft 112 such that torque flows from the input shaft 108 to the countershaft 112 across the gear mesh formed by the headset gear 122 and the countershaft gear element 126. Clutch 142 is shifted to the right such that gear 134 is connected to and rotates with the countershaft 112. Torque flows from the countershaft 112 across the gear mesh 134, 136 and to the mainshaft 110.

The sun gear 162 is connected to and driven by the mainshaft 110. The clutch 172 is shifted to the left such that the carrier 166 and ring gear 168 are connected to one another and co-rotate and the range gearing is in a high configuration. The sun gear 162 is meshed with and drives the planet pinions on the carrier 166 which is connected to and drives the output shaft 116 at a 1:1 drive ratio between the mainshaft 110 and the output shaft 116.

Clutch 144 may be preselected for a sequential shift. Clutches 140, 160 are in a neutral position. Clutch 156 is in a left hand position to maintain a forward gear ratio.

Figure 10:
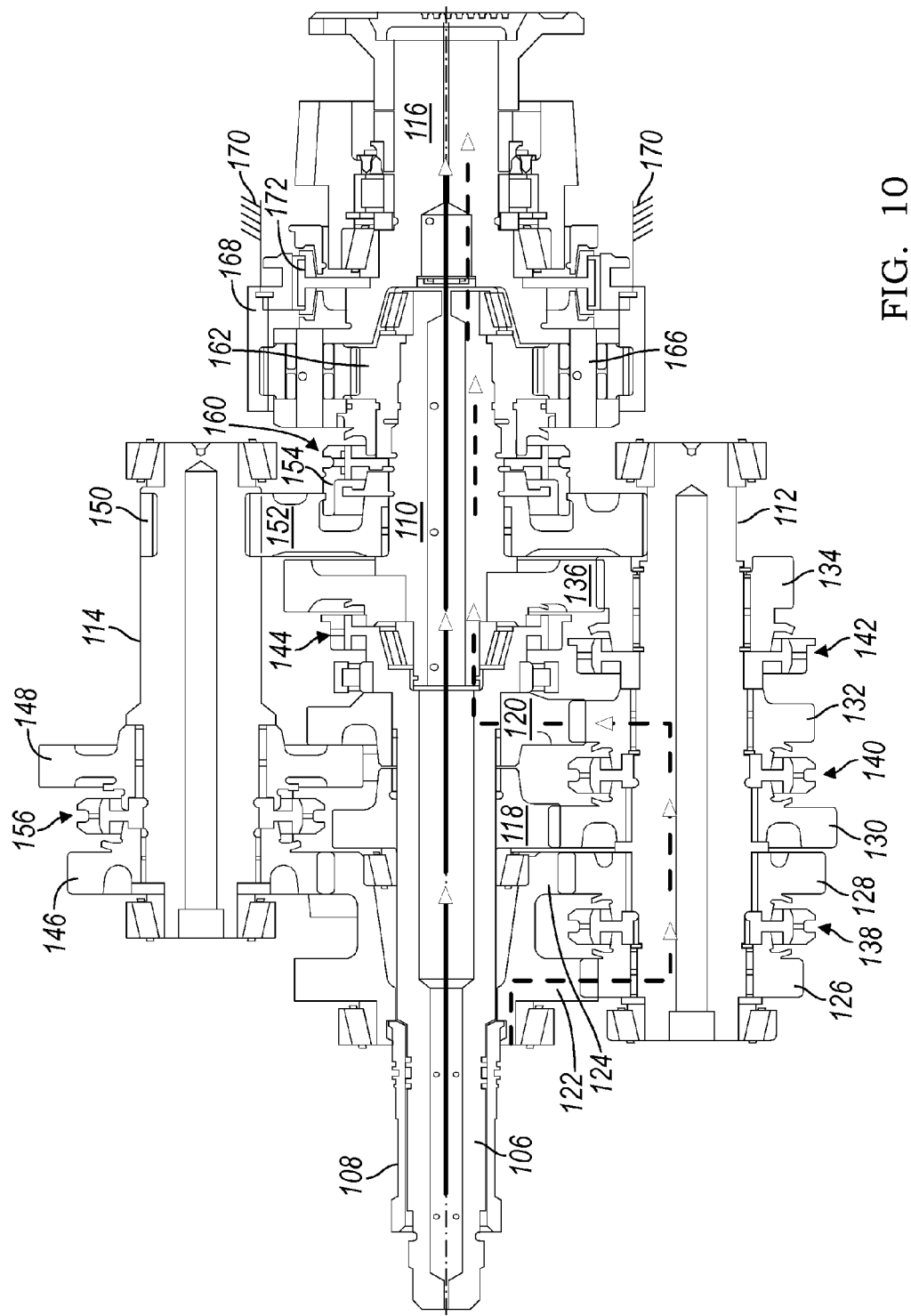
FIG. 10 is a schematic of the transmission of FIG. 2 illustrating a ninth powerpath.

FIG. 10 illustrates the transmission in a ninth gear ratio. The dual clutch 104 is engaged such that the torque flows to the input shaft 106. Clutch 144 is engaged to directly connect the input shaft 106 with the mainshaft 110, for example, via a connection to gear 136 which is fixed for rotation with the mainshaft 110. Torque flows from the input shaft 106 and to the mainshaft 110.

The sun gear 162 is connected to and driven by the mainshaft 110. The clutch 172 is shifted to the left such that the carrier 166 and ring gear 168 are connected to one another and co-rotate and the range gearing is in a high configuration. The sun gear 162 is meshed with and drives the planet pinions on the carrier 166 which is connected to and drives the output shaft 116 at a 1:1 drive ratio between the mainshaft 110 and the output shaft 116.

Clutches 140, 142 may be preselected for a sequential shift. Clutch 138 remains in its engaged position. Clutch 160 is in a neutral position. Clutch 156 is in a left hand position to maintain a forward gear ratio.

Figure 11:
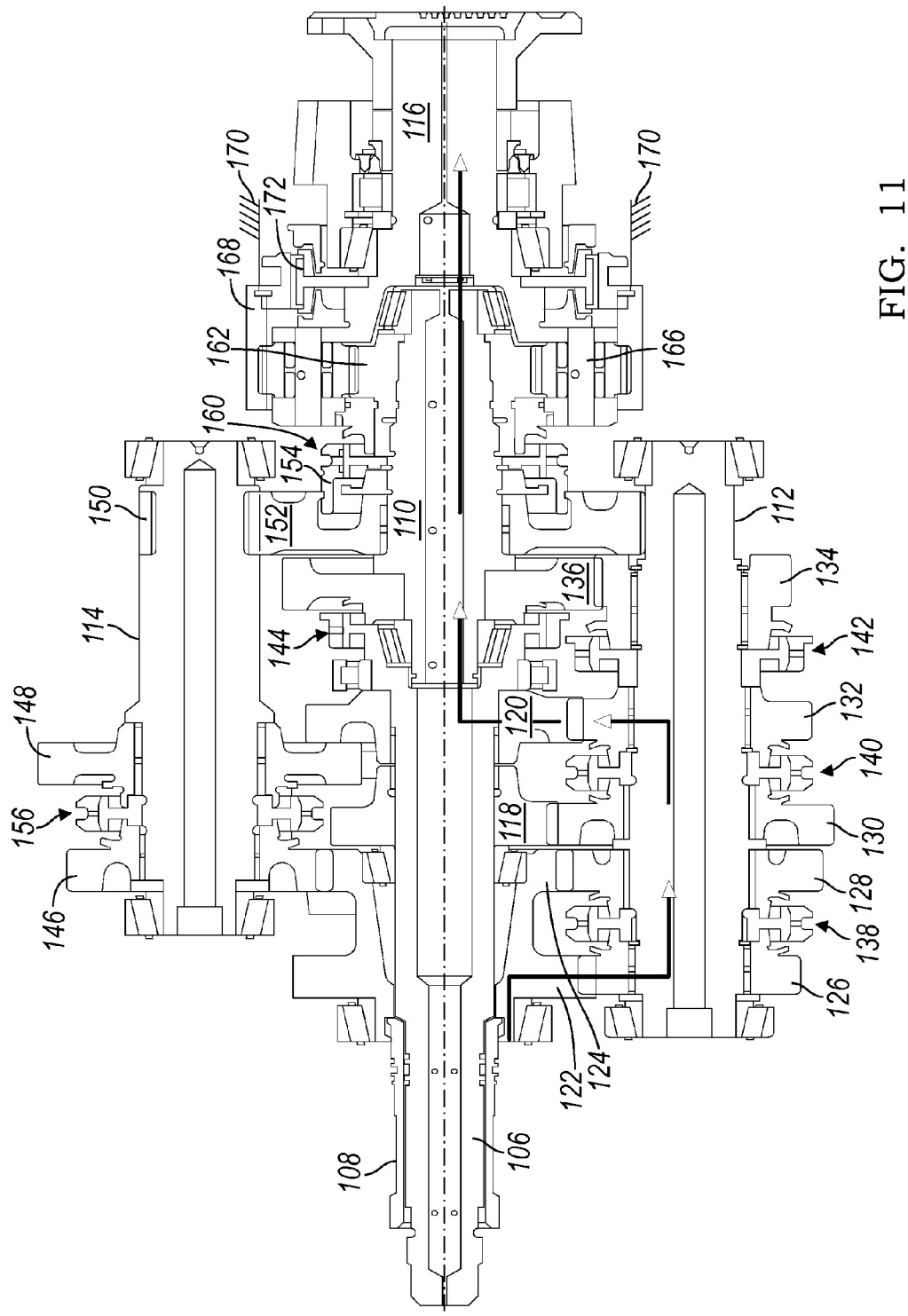
FIG. 11 is a schematic of the transmission of FIG. 2 illustrating a tenth powerpath.

FIG. 11 illustrates the transmission 100 in a tenth gear ratio. The dual clutch 104 is engaged such that the torque flows to the input shaft 108. Clutch 138 is shifted to the left to connect countershaft gear 126 to the countershaft 112 such that torque flows from the input shaft 108 to the countershaft 112 across the gear mesh formed by the headset gear 122 and the countershaft gear element 126. Clutch 140 is shifted to the right such that gear 132 is connected to and rotates with the countershaft 112. Torque flows from the countershaft 112 across the gear mesh 132, 136 and to the input shaft 106.

Clutch 144 is shifted to the right to connect the input shaft 106 and the gear 136 such that torque flows from the input shaft 106 to the mainshaft 110.

The sun gear 162 is connected to and driven by the mainshaft 110. The clutch 172 is shifted to the left such that the carrier 166 and ring gear 168 are connected to one another and co-rotate and the range gearing is in a high configuration. The sun gear 162 is meshed with and drives the planet pinions on the carrier 166 which is connected to and drives the output shaft 116 at a 1:1 drive ratio between the mainshaft 110 and the output shaft 116.

Clutches 142, 160 are in a neutral position. Clutch 156 is in a left hand position to maintain a forward gear ratio. FIG. 11 illustrates the transmission in tenth gear. The transmission 100 is now at its highest gear ratio, and no further upshifting occurs.

Figure 12:
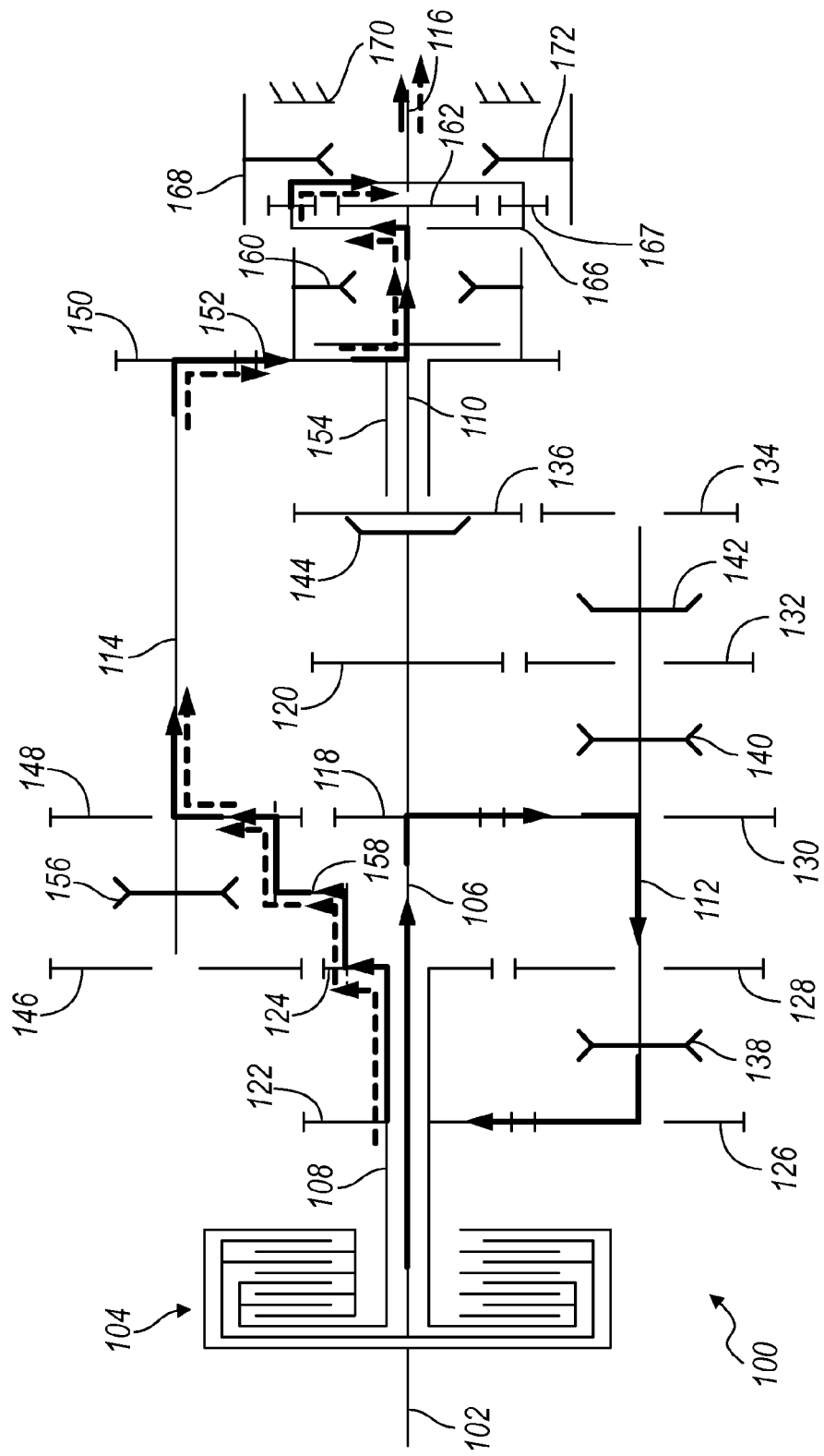
FIG. 12 is a schematic of the transmission of FIG. 2 illustrating a low reverse powerpath and a preselected high reverse powerpath.

FIG. 12 illustrates the transmission in a low reverse gear with a high reverse gear being preselected. The low reverse gear power path is shown by solid arrows. The high reverse gear is shown by a dashed line. To shift the transmission 100 from a forward gear ratio, as described above, to a reverse gear ratio, a torque interrupt occurs, as the transmission transitions between a forward speed and a reverse speed. The transmission 100 is able to powershift between reverse low and reverse high.

The torque path for the low reverse gear begins at the input shaft 102, and through the dual clutch 104 that is engaged such that the torque flows to the input shaft 106. Clutch 140 is engaged on the countershaft 112 and shifted to the left to connect journaled countershaft gear element 130 to the countershaft 112. Torque flows from the headset gear 118 to countershaft gear element 130 and to the countershaft 112. Clutch 138 is shifted to the left to connect the countershaft 112 to countershaft gear element 126 such that the torque flows to the headset gear 122 and to input shaft 108. Clutch 156 is shifted to the right to connect countershaft reverse gear 148 to the countershaft 114 such that torque flows from the input shaft 108 to the countershaft 114 through a gear train formed by input shaft gear 124, reverse idler gear 158, and countershaft gear 148.

Clutch 160 is shifted to the left such that gear 152 is connected to the mainshaft 110 for rotation therewith. Torque therefore flows from the countershaft 114 through meshed gears 150, 152 and to the mainshaft 110.

The sun gear 162 is connected to and driven by the mainshaft 110. The sun gear is meshed with and drives the planet pinions on the carrier 166 which is connected to and drives the output shaft 116. Clutch 172 is shifted to the right such that the ring gear 168 is connected and anchored to the transmission housing 170. Therefore the speed of the shaft 116 is reduced relative to the mainshaft 110. Torque flows from the mainshaft 110, through the sun gear 162, the carrier 166, and to the output shaft 116.

Note that the low reverse gear power or torque path forms a loop to flow through the input shaft 106, the countershaft 112, the other input shaft 108, and to the other countershaft 114. Clutches 142, 144 are in a neutral position.

The high reverse gear ratio is preselected as clutches 156, 160, and 172 are already engaged in the low reverse gear ratio, and to powershift from low reverse to high reverse requires only a change in the engagement of the dual clutch 104.

The high reverse gear power path is illustrated as a dashed line in FIG. 12. The dual clutch 104 is engaged such that the torque flows to the input shaft 108. Clutch 156 is in the right hand position to connect countershaft gear 148 to the countershaft 114 such that torque flows from the input shaft 108 to the countershaft 114 through a gear train formed by input shaft gear 124, reverse idler gear 158, and countershaft reverse gear 148.

Clutch 160 is shifted to the left such that gear 152 is connected to the mainshaft 110 for rotation therewith. Torque therefore flows from the countershaft 114 through meshed gears 150, 152 and to the mainshaft 110.

The sun gear 162 is connected to and driven by the mainshaft 110. The sun gear is meshed with and drives the planet pinions on the carrier 166 which is connected to and drives the output shaft 116. Clutch 172 is shifted to the right such that the ring gear 168 is connected and anchored to the transmission housing 170. Therefore the speed of the shaft 116 is reduced relative to the mainshaft 110. Torque flows from the mainshaft 110, through the sun gear 162, the carrier 166, and to the output shaft 116.

The Table below provides a summary of the clutch positions for the various gear ratios for the transmission 100. A left hand position is indicated by an "L", a right hand position is indicated by a "R", a neutral position is indicated by an "N", and the clutch being in a preselected position for a sequential shift is indicated by a "*".

| Gear Ratio | Clutch 138 | Clutch 140 | Clutch 142 | Clutch 144 | Clutch 156 | Clutch 160 | Clutch 172 |
|---|---|---|---|---|---|---|---|
| First | L | L | N | N | L | L | R |
| Second | * | L | * | N | L | L | R |
| Third | N | L | R | N | L | * | R |
| Fourth | N | L | R | N | L | R | * |

| Gear Ratio | Clutch 138 | Clutch 140 | Clutch 142 | Clutch 144 | Clutch 156 | Clutch 160 | Clutch 172 |
|---|---|---|---|---|---|---|---|
| Fifth | * | L | R | N | L | * | L |
| Sixth | R | * | R | N | L | N | L |
| Seventh | * | R | R | N | L | N | L |
| Eighth | L | * | R | * | L | N | L |
| Ninth | L | * | * | R | L | N | L |
| Tenth | L | R | N | R | L | N | L |
| Reverse Low | L | L | N | N | R | L | R |
| Reverse High | L | L | N | N | R | L | R |

Figure 13:
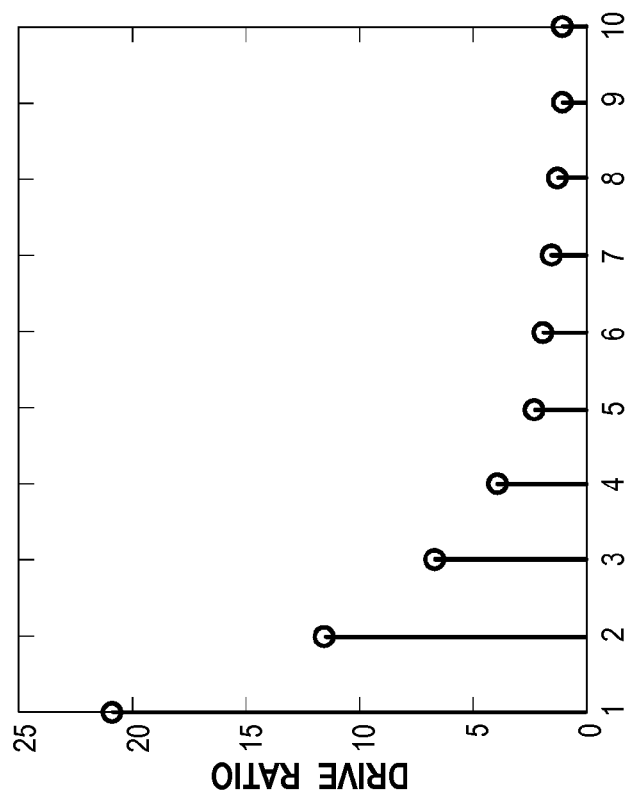
FIG. 13 is a graph illustrating forward ratios for the transmission layout as shown in FIG. 2 according to an embodiment.

FIG. 13 illustrates forward ratios for the gear diameters and layout of the transmission 100 of FIGS. 1 and 2 according to an embodiment. As can be seen by the graph, each forward gear ratio is smaller than the one before it, such that the gear ratios have a progressively decreasing step size as the gear number increases. Gear diameters and power paths for the various transmission 100 layouts are selected such that the gear ratio progressively decreases in this manner.

Figure 14:
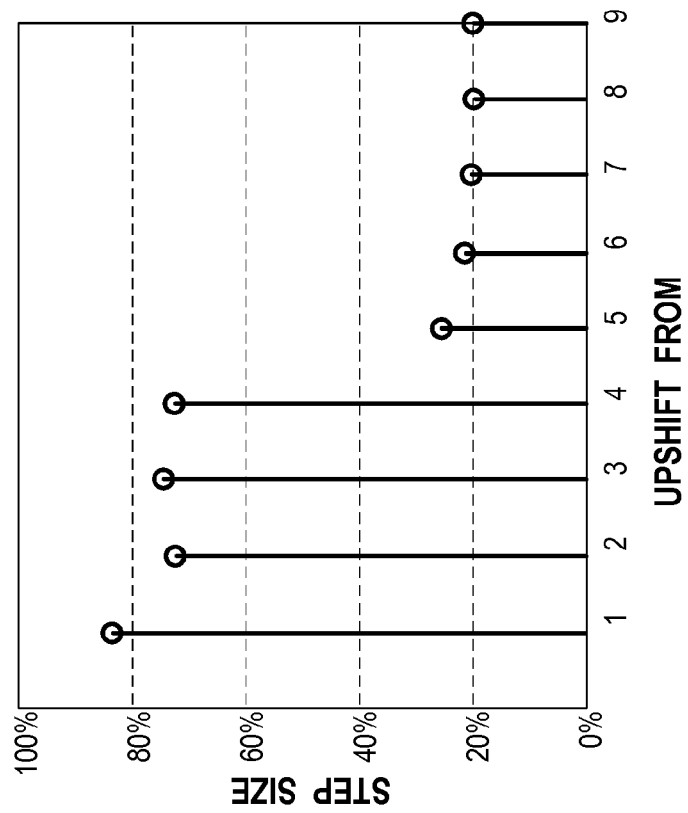
FIG. 14 is a graph illustrating step sizes for the transmission layout as shown in FIG. 2 according to an embodiment and corresponding to the graph in FIG. 13.

FIG. 14 illustrates step sizes for the transmission 100 according to an embodiment. As can be seen by the graph, the step sizes are large in the lower, launch gears and shifts, and small in the higher gears and shifts. Generally, the step sizes for gear ratios one through four are 70-80%, while the step sizes for gear ratios five and above are approximately 20%.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A dual clutch transmission comprising:
   a first input shaft supporting first and second headset gear elements;
   a second input shaft concentric with the first input shaft and supporting third and fourth headset gear elements;
   a dual clutch assembly connected to the first and second input shafts;
   a mainshaft coaxial with the first input shaft and supporting first and second mainshaft gear elements, and a sun gear connected to the mainshaft for rotation therewith; a first countershaft offset from the first input shaft and supporting five countershaft gear elements;
   a second countershaft offset from the first input shaft and supporting three countershaft gear elements;
   a range gearing having high and low ratios, the range gearing having a carrier and a ring gear cooperating with the sun gear of the mainshaft to form a planetary gearset; and an output shaft coaxial with and connected to the carrier of the range gearing for rotation therewith;
   wherein the first and second input shafts, the mainshaft, and the first and second countershafts provide six forward gear meshes for the transmission;
   wherein the six forward gear meshes and the high and low range ratios of the range gearing provide ten forward gear ratios for the transmission; and
   wherein the transmission is powershiftable between consecutive gear ratios of the ten forward gear ratios such that no torque interrupt occurs during sequential shifts.

2. The dual clutch transmission of claim 1 further comprising gear ratio change clutches for selectively establishing torque flow paths through the transmission; wherein a first gear ratio has a torque flow path provided sequentially through the first input shaft, the first countershaft, the second input shaft, the second countershaft, the mainshaft, the range gearing in the low ratio, and the output shaft.

3. The dual clutch transmission of claim 2 wherein a second gear ratio has a torque flow path provided sequentially through the second input shaft, the second countershaft, the mainshaft, the range gearing in the low ratio, and the output shaft.

4. The dual clutch transmission of claim 1 further comprising a first clutch and a second clutch configured to selectively establish low and high range ratios, the first and second clutches adapted to preselect a high range ratio when a torque flow path includes the low range ratio such that the range gearing is powershifted when the dual clutch assembly is engaged and disengaged.

5. The dual clutch transmission of claim 4 wherein the first clutch is configured to selectively connect the second mainshaft gear element to the mainshaft and to the carrier; and wherein the second clutch is configured to selectively connect the ring gear to the transmission housing and the carrier.

6. The dual clutch transmission of claim 4 wherein a third gear ratio has a torque flow path provided sequentially through the first input shaft, the mainshaft, the range gearing in the low ratio, and the output shaft; wherein one of the first and second clutches is preselected for an adjacent gear ratio and is independent of the third torque flow path.

7. The dual clutch transmission of claim 6 wherein a fourth gear ratio has a torque flow path provided sequentially through the second input shaft, the second countershaft, the range gearing in the low ratio, and the output shaft; wherein the other of the first and second clutches is preselected for an adjacent gear ratio and is independent of the fourth torque flow path.

8. The dual clutch transmission of claim 7 wherein a fifth gear ratio has a torque flow path provided sequentially through the first input shaft, the first countershaft, the mainshaft, the range gearing in the high ratio, and the output shaft; wherein the one of the first and second clutches is preselected for an adjacent gear ratio and is independent of the fifth torque flow path.

9. The dual clutch transmission of claim 1 further comprising gear ratio change clutches for selectively establishing torque flow paths through the transmission; wherein a sixth gear ratio has a torque flow path provided sequentially through the second input shaft, the first countershaft, the mainshaft, the range gearing in the high ratio, and the output shaft.

10. The dual clutch transmission of claim 1 further comprising gear ratio change clutches for selectively establishing torque flow paths through the transmission; wherein a seventh gear ratio has a torque flow path provided sequentially through the first input shaft, the first countershaft, the mainshaft, the range gearing in the high ratio, and the output shaft.

11. The dual clutch transmission of claim 1 further comprising gear ratio change clutches for selectively establishing torque flow paths through the transmission; wherein an eighth gear ratio has a torque flow path provided sequentially through the second input shaft, the first countershaft, the mainshaft, the range gearing in the high ratio, and the output shaft.

12. The dual clutch transmission of claim 1 further comprising gear ratio change clutches for selectively establishing torque flow paths through the transmission; wherein a ninth gear ratio has a torque flow path provided sequentially through the first input shaft, a clutch drivably connecting the first input shaft and the mainshaft, the mainshaft, the range gearing in the high ratio, and the output shaft.

13. The dual clutch transmission of claim 1 further comprising gear ratio change clutches for selectively establishing torque flow paths through the transmission; wherein a tenth gear ratio has a torque flow path provided sequentially through the second input shaft, the first countershaft, the first input shaft, a clutch drivably connecting the first input shaft and the mainshaft, the mainshaft, the range gearing in the high ratio, and the output shaft.

14. The dual clutch transmission of claim 1 wherein the five countershaft gear elements of the first countershaft are in meshed engagement with the first, second, third, and fourth headset gears and the first mainshaft gear, respectively; and the three countershaft gear elements of the second countershaft are in meshed engagement with the second and third headset gears and the second mainshaft gear, respectively.

15. The dual clutch transmission of claim 1 further comprising: a first clutch supported by the first countershaft and adapted to selectively connect two of the five countershaft gear elements to the first countershaft; a second clutch supported by the first countershaft and adapted to selectively connect another two of the five countershaft gear elements to the first countershaft; a third clutch supported by the first countershaft and adapted to selectively connect one of the five countershaft gear elements to the first countershaft; a fourth clutch supported by the second countershaft and adapted to selectively connect two of the three countershaft gear elements to the second countershaft; a fifth clutch adapted to selectively connect the first input shaft and the mainshaft; and a sixth clutch adapted to selectively connect the second mainshaft gear element to the mainshaft and to the carrier; and a seventh clutch adapted to selectively connect the ring gear to the transmission housing and the carrier.

16. The dual clutch transmission of claim 1 wherein the first countershaft is offset from the second countershaft.

17. The dual clutch transmission of claim 1 further comprising an idler reverse gear and a forward-reverse clutch, the idler reverse gear in meshed engagement with one of the headset gears and one of the second countershaft gears.

18. A dual clutch transmission comprising:
a dual clutch assembly;
a first input shaft connected to the dual clutch assembly and supporting a first headset gear element;
a second input shaft connected to the dual clutch assembly and concentric with the first input shaft, the second input shaft supporting a second headset gear element;
wherein the dual clutch assembly selectively establishes and disestablishes driving connections between an engine and each of the first and second input shafts to powershift the transmission between consecutive gear ratios;
a mainshaft coaxial with the first and second input shafts;
a first countershaft offset from the first input shaft and supporting a first countershaft gear element forming a first gear mesh with the first headset gear element and a second countershaft gear element forming a second gear mesh with the second headset gear element, wherein the second gear mesh is positioned between the dual clutch assembly and the first gear mesh; an output shaft;
planetary range gearing connected to the mainshaft and having high and low range clutches adapted to provide a preselect a high range ratio and a low range ratio;
gear ratio change clutches for selectively establishing torque flow paths through the transmission; and
wherein a torque flow path is provided sequentially through the first input shaft, the first gear mesh, the first countershaft, the second gear mesh, the second input shaft, and the output shaft.

19. The dual clutch transmission of claim 18 further comprising a second countershaft offset from the first input shaft and in meshed engagement with the second input shaft, wherein the torque flow path is provided from the second input shaft to the second countershaft and to the output shaft.

20. A dual clutch transmission comprising:
a dual clutch assembly;
a first input shaft selectively driven by the dual clutch assembly;
a second input shaft concentric with the first input shaft and selectively driven by the dual clutch assembly;
a mainshaft;
a first countershaft assembly offset from the first input shaft and having countershaft gear elements in meshed engagement with gear elements of the first input shaft, the second input shaft, and the mainshaft to provide five forward gear meshes;
a second countershaft assembly offset from the first input shaft and the second input shaft and having countershaft gear elements in meshed engagement with gear elements of the first input shaft, the second input shaft, and the mainshaft;
planetary range gearing connected to the mainshaft and having high and low range clutches adapted to provide and preselect a high range ratio and a low range ratio; and
an output shaft connected to the planetary range gearing;
wherein the transmission is powershiftable between ten consecutive forward gear ratios such that the transmission operates without torque interrupts during sequential increasing and decreasing forward shifts.

21. A dual clutch transmission comprising:
a dual clutch assembly;
a first input shaft selectively driven by the dual clutch assembly;
a second input shaft concentric with the first input shaft and selectively driven by a dual clutch assembly;
a mainshaft coaxial with the first and second input shafts;
a first countershaft assembly offset from the first input shaft and having countershaft gear elements in meshed engagement with gear elements of the first input shaft, the second input shaft, and the mainshaft to provide five forward gear meshes;
a second countershaft assembly offset from the first input shaft and the second input shaft and having countershaft gear elements in meshed engagement with gear elements of the first input shaft, the second input shaft, and the mainshaft;
a range gearing having high and low ratios, the range gearing having a carrier and a ring gear cooperating with a sun gear of the mainshaft;

an output shaft coaxial with and connected to the carrier of the range gearing for rotation therewith; and wherein the transmission is powershiftable between ten consecutive forward gear ratios such that the transmission operates without torque interrupts during sequential increasing and decreasing forward shifts.

22. The dual clutch transmission of claim 21 wherein the first countershaft assembly includes a first countershaft that supports five countershaft gear elements and wherein the second countershaft assembly includes a second countershaft that supports three countershaft gear elements.

23. The dual clutch transmission of claim 22 further comprising gear ratio change clutches for selectively establishing torque flow paths through the transmission; wherein a first gear ratio has a torque flow path provided sequentially through the first input shaft, the first countershaft, the second input shaft, the second countershaft, the mainshaft, the range gearing in the low ratio, and the output shaft.

24. The dual clutch transmission of claim 23 wherein a second gear ratio has a torque flow path provided sequentially through the second input shaft, the second countershaft, the mainshaft, the range gearing in the low ratio, and the output shaft.

25. The dual clutch transmission of claim 21, further comprising a first clutch and a second clutch configured to selectively establish low and high range ratios, the first and second clutches adapted to preselect a high range ratio when a torque flow path includes the low range ratio such that the range gearing is powershifted when the dual clutch assembly is engaged and disengaged.

* * * * *